March 22, 1966 H. R. CHOPE 3,242,321
AUTOMATIC MACHINE ANALYZER
Original Filed May 31, 1961 5 Sheets-Sheet 1

INVENTOR
Henry R. Chope
by Anthony D. Cennamo
ATTORNEY

March 22, 1966 H. R. CHOPE 3,242,321
AUTOMATIC MACHINE ANALYZER
Original Filed May 31, 1961 5 Sheets-Sheet 2

INVENTOR
Henry R. Chope
BY Anthony D. Cennamo
ATTORNEY

March 22, 1966     H. R. CHOPE     3,242,321
AUTOMATIC MACHINE ANALYZER

Original Filed May 31, 1961     5 Sheets-Sheet 5

TROUBLE LOCATOR BOARD

| #1 MACHINE | #2 MACHINE | #3 MACHINE |
|---|---|---|
| VIBRATION | VIBRATION | VIBRATION |
| OK   GARNITURE   CHECK<br>71—○   SECTION   ○—72 | OK   GARNITURE   CHECK<br>○   SECTION   ○ | OK   GARNITURE   CHECK<br>○   SECTION   ○ |
| ○   FEEDER SECTION   ○ | ○   FEEDER SECTION   ○ | ○   FEEDER SECTION   ○ |
| ○   FEEDER SHAFT   ○ | ○   FEEDER SHAFT   ○ | ○   FEEDER SHAFT   ○ |
| ○   SPEED CHANGER   ○ | ○   SPEED CHANGER   ○ | ○   SPEED CHANGER   ○ |
| ○   DRIVE MOTOR   ○ | ○   DRIVE MOTOR   ○ | ○   DRIVE MOTOR   ○ |
| ○   DRIVE SHAFT   ○ | ○   DRIVE SHAFT   ○ | ○   DRIVE SHAFT   ○ |
| PUMP PRESSURE | PUMP PRESSURE | PUMP PRESSURE |
| ○   LUBRICATION   ○ | ○   LUBRICATION   ○ | ○   LUBRICATION   ○ |
| ○   GLUE FEED   ○ | ○   GLUE FEED   ○ | ○   GLUE FEED   ○ |

*Fig. 6*

INVENTOR
Henry R. Chope
By Anthony D. Cennamo
ATTORNEY

United States Patent Office 3,242,321
Patented Mar. 22, 1966

3,242,321
AUTOMATIC MACHINE ANALYZER
Henry R. Chope, Columbus, Ohio, assignor to Industrial Nucleonics Corporation, a corporation of Ohio
Continuation of application Ser. No. 113,708, May 31, 1961. This application Feb. 11, 1965, Ser. No. 433,543
14 Claims. (Cl. 235—151.13)

This is a continuation of my copending application Serial No. 113,708, filed May 31, 1961, now abandoned.

This invention relates to methods and apparatus for automatically locating and indicating faults in processing machinery. More particularly the invention relates to an automatic machine analyzer which correlates and locates sources of machine trouble such as vibration or pressure surging which cause undesirable variations in the output product.

It is desired that products manufactured by machinery possess the highest degree of uniform characteristics such as thickness, density, and shape. In a particular manufacturing process, the uniformity of the output product is determined by many input or process variables. For a highly uniform product it is necessary that these input variations be either controlled, stabilized, or eliminated.

Input variations such as vibration in a metal forming process or surging of pumps in a hydrodynamic process (such as a Fourdrinier paper machine) may cause corresponding variations in the output products. Since various processing machines contain drive motors, rotating shafts, gears, and drive belts, vibrations appear at various points in a machine.

Various measuring instruments have been developed to locate and measure the frequencies and amplitudes of vibrations at various points on a machine. Such instruments are referred to variously as vibration analyzers, vibration discriminators, or vibration sensors. Vibration sensors, when placed in contact with a given vibrating member, yield data that may be useful for subsequent maintenance or balancing of the machine to lessen the vibration. These vibration analyzers do not indicate or determine the effect or degree to which a given vibrating member degrades or causes variations in the output product.

On the other hand, process analyzers are available which measure the output product and by proper computation and presentation yield information that a skilled technician or mechanic can utilize for locating machine faults. Such process analyzers usually present product variations as a time record of the variation (such as running weight per unit area of product) or as a frequency spectrum of the variation frequencies present in the output product. One such process analyzer is described in U.S. Patent No. 2,965,300 and a copending application Serial No. 707,191 now Patent No. 3,091,756. In the process analyzer described variations in weight per unit length of continuous material such as a cigarette rod are measured by a noncontacting density gauge. The process analyzer automatically computes the variances of the cigarette rod weights computed against the desired mean cigarette weights. If the variance of the cigarette weight exceeds some predetermined magnitude, the running density of the cigarette rod is then traced on a moving chart. Anomalous or excessive variations are then noted by a skilled machine technician who can track down and locate the cause of the output variation in terms of some machine variable. By use of these analyzers, it has been possible to perform guided repairs or replacements on machines. Bent shafts, slipping belts, missing teeth on gears, or mechanical unbalances are usually rapidly located so that maintenance personnel can direct their attention to replacing the defective part. Although such process analyzers have great utility, their use still depends upon a human's knowledge to correlate a given output variation with a specific machine fault.

My invention described herein automatically locates the source or site of an undesirable variation caused by vibrating, rotating, shaking, or surging machine elements. Thus a human's knowledge is not required to determine a priori the cause and effect relationships between machine conditions and their effects on the output product.

It should be emphasized that undesirable vibrations or variations are those that cause corresponding variations in the output product. So long as other machine vibrations do not cause excessive rates of wear to the internal process or machine, they are in the present invention disregarded.

The automatic machine fault analysis of the present invention involves the automatic computation of the cross correlation functions between the measured value of the output product characteristic (such as running weight per length) and the variational signals from multiple vibration or pressure sensors placed in contact with various vibrating or rotating machine elements. The cross correlation function measures the linear dependence of one function on another. A more extensive discussion of cross correlation functions and apparatus for computing these functions can be found in my copending application Serial No. 827,881, filed July 17, 1959, now Patent No. 3,039,687. In that copending application the system relates to automatic control in which multiple self-adjustments are made on various input variables (such as speeds, material tensions, and pressures) to maintain the output product essentially constant. The use and computation of the cross correlation functions are for the purposes of apportioning the amount of corrections to be made automatically to various selected input process variables.

The present invention uses the cross correlation functions to locate and indicate process variable (such as vibration) which cause an undesirable variation in the quality of the output product.

Accordingly it is an object of this invention to provide a means and apparatus for automatically locating those sources of machine faults whose variations cause undesirable variations in the output product.

A further object is to provide apparatus which automatically correlates measured variations in parts of process machinery with corresponding measured variations in the output product.

Another object of the invention is to provide a data presentation panel which graphically indicates the place of trouble on a given manufacturing machine or process.

Still a further object of the invention is to provide an automatic machine analyzer that is readily adaptable to present day industrial process with only a minimum of modification.

These and other objects of this invention will become apparent upon examination of the following specifications when taken with the accompanying drawings of which:

FIG. 1 is a block diagram showing symbolically the dependence of the output product on multiple input variables and machine conditions.

FIGS. 2a, 2b, 2c, 2d, and 2e illustrate certain signal or voltage waveforms useful in explaining the operating principles of this invention.

FIG. 6 is a drawing showing a trouble locator board for automatically indicating the source and area of a machine fault.

The cross correlation function between two functions of time, $v(t)$ and $w(t)$, is defined as $$\phi_{vw}(\tau) = \lim \frac{1}{T}\int_{-T/2}^{T/2} w(t) \cdot v(t-\tau)\, dt \qquad (1)$$

Practically the mathematical process of extending T to the limit ∞ (infinity) reduces to selecting a sampling and averaging period T of such duration that representative samples of both time functions are obtained.

Therefore (1) can be written as $$\phi_{vw}(\tau) = \frac{1}{T}\int_{0}^{T} w(t) \cdot v(t-\tau)\, dt \qquad (2)$$

Obtaining the cross correlation function between $w(t)$ and $v(t)$ involves three steps:

(1) Delaying or shifting one function in time with respect to the other.

(2) Multiplying the delayed function by the other function.

(3) Averaging the multiplied functions over an averaging period T.

Since the integral in (2) is a time average, the cross correlation function is thus a function of the delay or shift variable, $\tau$. The cross correlation between $w$ and $v$ is a measure of the interdependence between $w$ and $v$. It is usually necessary to remove the D.C. component from each function to simplify computation of $\phi(t)$. It should be understood hereinafter that the D.C. components of the measured process variable and of the measured product characteristics are removed by suitable networks prior to computation. That is, values of $v_1$, $v_2$, $v_3$, ..., $v_n$ and $w_1$, $w_2$, $w_3$, ... $w_n$ are measured with respect to their mean values.

Figure 1:
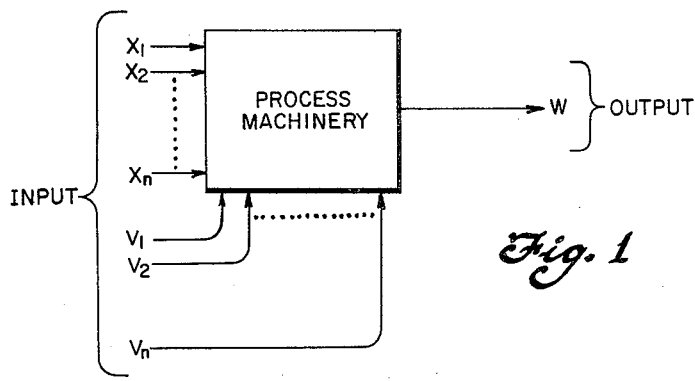

Referring now to the figures. FIG. 1 shows symbolically that the output of a practical process is a function of many input variables. The output $w$ may be any product characteristic such as thickness, density, or weight per unit length. It is usually desirable to minimize variations in these product characteristics.

Inputs designated as $x_1$, $x_2$, $x_3$, ..., $x_n$ represent adjustable variables that can be automatically or manually adjusted to minimize output variations in the product. Variables $v_1$, $v_2$, $v_3$, ..., $v_n$ are variables such as vibrations or surging pressure changes in pumps whose value cannot be easily and rapidly changed. It is often possible by proper machine maintenance and replacement of defective parts to minimize or eliminate such variations. Such variables are sometimes referred to as "nonadjustable" inputs. A convenient measure of the degree to which a given nonadjustable variable causes output product variations is the magnitude of the cross correlation coefficient between the measured nonadjustable variable (such as vibration at a point in the process machinery) and the measured product characteristic (such as weight per unit length).

Lags exist between the time of change of an input variable and the time at which its effect can be measured in the output product. Such lags are often referred to an transport lags in practical processes. If the transport lag is known between a particular input variable, $v_1$, and the output product characteristic, $w$, this value of time lag is used as the delay variable, $\tau$, in computing the cross correlation between $v_1$ and $w$. That is, the cross correlation function $\phi_{1w}$ is computed as $$\phi_{1w}(\tau_{1w}) = \frac{1}{T}\int_{0}^{T} w(t)\cdot v_1(t-\tau_{1w})\, dt \qquad (3)$$

$\phi_{1w}(\tau_{1w})$ is interpreted as the cross correlation function between input variable, $v_1$, and output product characteristic $w$ with a delay of $\tau_{1w}$ seconds.

For input-output functions which correlate with one another, taking a time delay equal to the transport lag between the particular input and output function will yield the maximum magnitude of their cross correlation function.

Figure 2A:
Figure 2B:
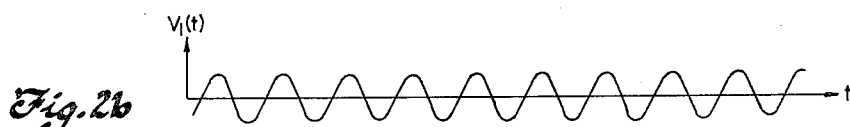
Figure 2C:
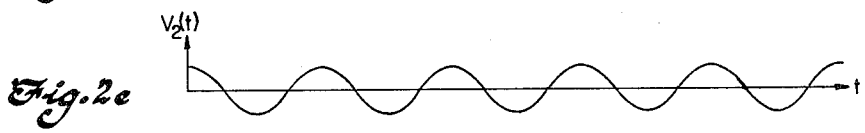

FIGS. 2a, 2b, and 2c indicate waveforms as would be measured at the output and at various points of vibration on process machinery.

Figure 2D:
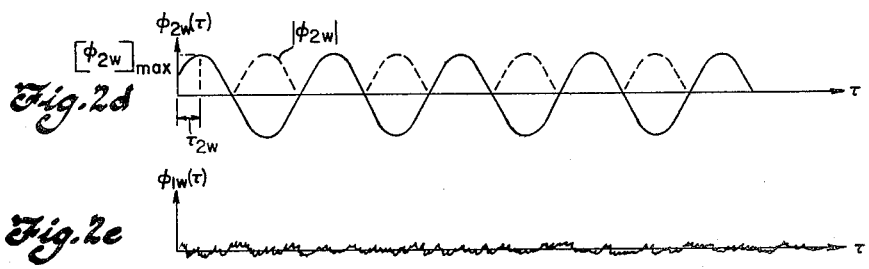

FIG. 2d shows the correlation function between the output $w(t)$ and the vibration $v_2(t)$. The output $w(t)$ consists of random variations (not correlated directly with a measured vibration) plus a periodic component caused and thus correlated with vibration $v_2(t)$. It should be noted that the cross correlation coefficient between a sinusoidal variation of angular frequency $\omega_2$ and another periodic function of the same frequency $\omega_2$ is itself a periodic function of frequency $\omega_2$ or period $2\pi/\omega_2$. Such cross correlation function is shown in FIG. 2d. Note that the cross correlation function does not vanish as $\tau \to \infty$. The maximum amplitude of $\phi_{2w}(\tau)$ is found at $\tau = \tau_{2w}$. The dotted curve in FIG. 2d plots the amplitude or magnitude of $\phi_{2w}(\tau)$ without regard to polarity. This positive signal would be obtained by an absolute value circuit or a full wave bridge rectifier.

Figure 2E:
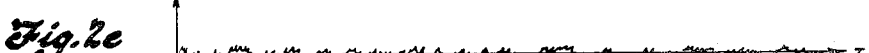

FIG. 2e illustrates lack of correlation between $w(t)$ and $v(t)$. The cross correlation of two sinusoidal signals of different frequencies is identically zero since their average power is zero.

Figure 3:
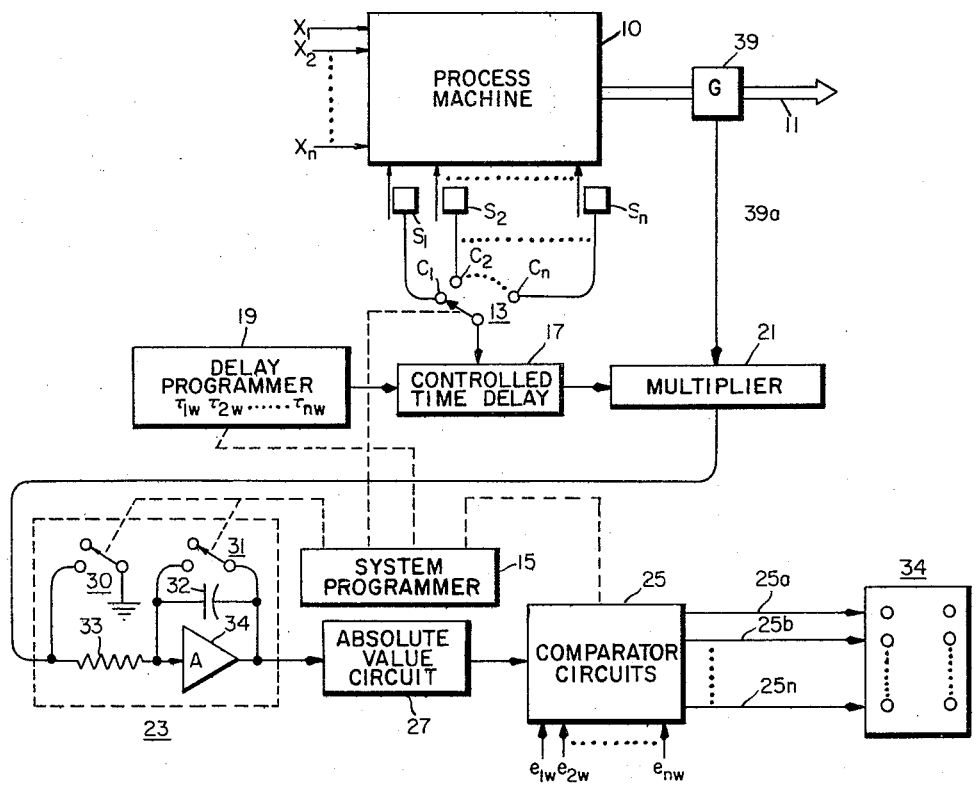
FIG. 3 is a block diagram explaining the various measuring and computation functions necessary for the operation of the present invention.

FIG. 3 is a block diagram showing one embodiment of the invention. The process machine 10 is illustrated as yielding an output product 11. Variables $x_1$, ..., $x_n$ are those that are adjustable and are often self-regulated or automatically controlled with respect to measurements on product 11. Sensors $S_1$, $S_2$, ..., $S_n$ represent devices to measure vibrations or pressure surging. The signals from each sensor are connected to contacts $C_1$, $C_2$, ..., $C_n$ of switch 13. The system programmer 15 performs the following functions: First, it alternately switches the signal outputs from the sensors to the controlled time delay 17. Secondly, the system programmer 15 activates the delay programmer 19. Thirdly, it resets integrator 23 after each averaging period T. The programmer 15 also opens circuits in the comparator circuits 25 so that new values of $\phi(\tau)$ will not reverse previous comparisons. The controlled time delay 17, delays each sensor signal by an amount equal to the transport lag between the sensed signal and the measured product output. A description of an analog time delay device for delaying multiple signals by a predetermined amount is described in my pending application supra. Delay programmer 19 selects the proper delay channel for each sensor output. The signal outputs from the time delay 17 would be represented as $$v_1(t-\tau_{1w})$$
$$v_2(t-\tau_{2w})$$
.
.
.
$$v_n(t-\tau_{nw})$$

At the output side of the process as typified by the process machine 10 a gauge measures an important product characteristic. Product characteristics of interest (depending on the particular process) are thickness, shape of product, weight per unit area, or weight per unit length. The time varying product characteristic which for purposes of illustration will be considered as weight per unit length of product is measured by gauge 39 and connected by line 39a to multiplier 21. Multiplier 21 which may be of various analog types (for example, a self-balancing servo multiplier) multiplies the weight function $w$ by the delayed function $v(t-\tau)$. After system programmer 15 switches to the next sensor $S_2$, switches 30 and 31 at the input to integrator 23, and across capacitor 32 are opened by action of programmer 15 so that integrator will form the average.

$$\phi_{2w}(\tau_{2w}) = \frac{1}{T}\int_0^T v_2(t-\tau_{2w}) \cdot w(t)\, dt \qquad (4)$$

The output from the integrator 23 is fed to an absolute value circuit. The function of the absolute value circuit 27 is to reverse the polarity of any negative going values of the cross correlation function. The absolute value circuit may be of various forms as used in analog computers. At the output of the absolute value circuit 27, the magnitude of the cross correlation function is obtained, $|\phi_{2w}|$.

It should be understood herein that the value of a variable or of the cross correlation functions may be represented by an electrical signal appearing at a given point or along a given line in the various figures. Comparator circuits 25 compare each cross correlation function to a standard, preselected voltage value which represents the maximum value each correlation function should possess before a particular trouble is indicated.

The system programmer 15 alternately switches each cross correlation function (relating the product output to a given vibration or pressure) to suitable comparators. If the signal equivalent of a given cross correlation function (for example, $|\phi_{1w}|$) is less than the standard preset voltage $e_{1w}$, a corresponding light on the automatic trouble locator board 34 will register "O.K." If, however, the signal equivalent to the cross correlation function becomes greater than the preselected value, $e_{1w}$, an adjacent indicator will become illuminated so as to indicate that a check should be made at the designated point of signal pick-up on the process machine. Lines $25_a$, $25_b$, ..., $25_n$ carry switch signals which cause lights on the automatic trouble locator board to indicate that a given machine condition variable is either "O.K." or requires checking. By the indication "O.K." it is meant that the input machine variable is below some value in its effect on the output product.

Figure 4:
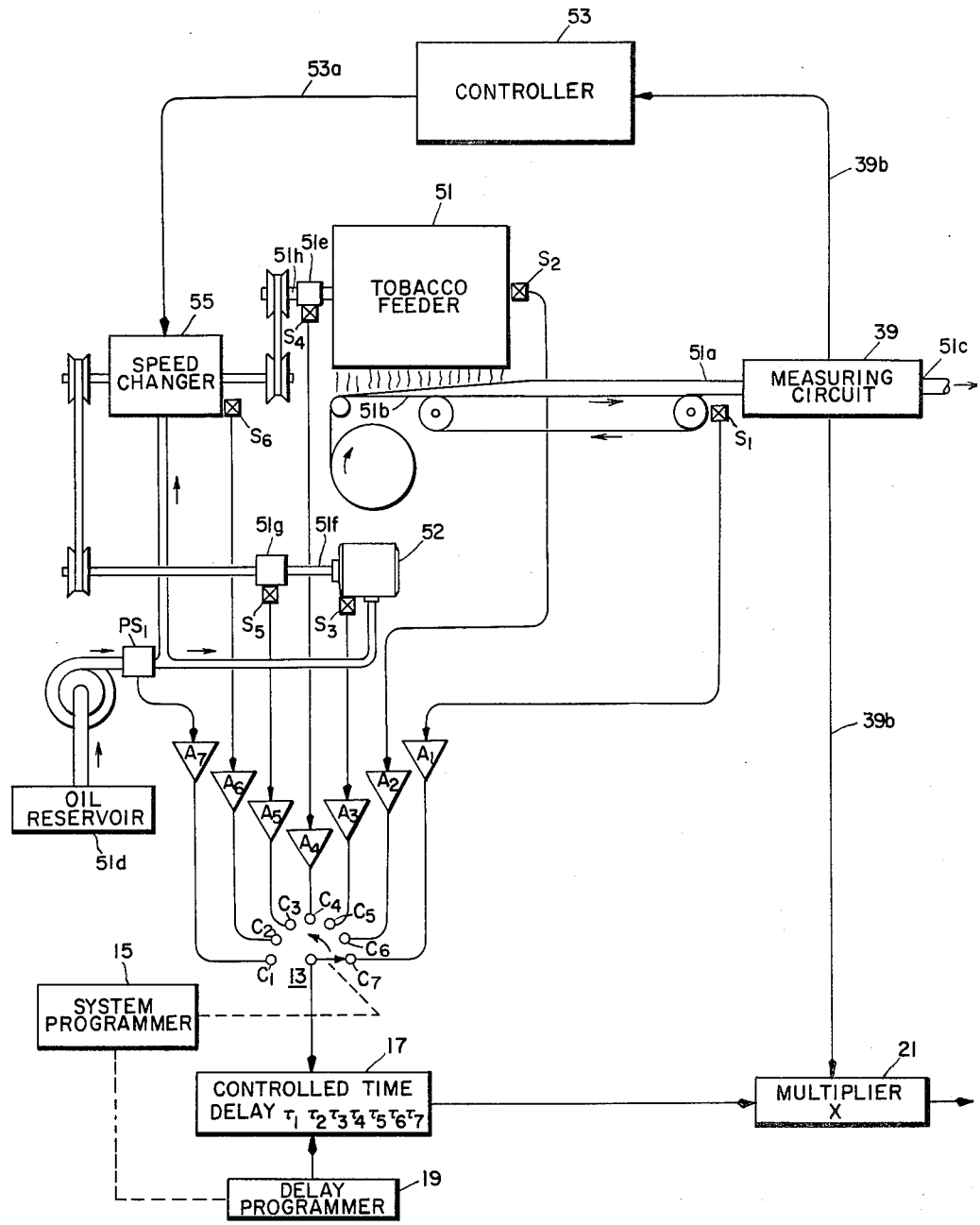
FIG. 4 is a simplified diagram and schematic explaining the operation of my invention for fault location on a specific process machine.

A specific embodiment of my invention is illustrated in FIG. 4 adapted to a making machine which produces a fibrous, continuous material such as a cigarette rod. The making machine is regulated by conventional automatic feedback control. The purpose of the present invention is to locate anomalous sources of vibration or pressure surging or other undesirable input variables whose value may be translated to a vibration. An explanation of the automatic feedback control system is given in detail in U.S. Patent No. 2,954,775. Generally shown in FIG. 4 tobacco from the feeder 51 or hopper section falls onto a narrow, moving strip conveyor $51b$. This moving deposit of tobacco is then transferred onto a narrow moving strip of paper which in turn is curled and rolled so as to yield at point $51a$ a continuous cigarette rod. The continuous cigarette rod is measured by measuring unit 39. The weight per unit length of rod is transmitted by line $39b$ to the electronic controller 53. The electronic controller 53 computes an error of voltage which is fed back along line $53a$ to the speed changer 55. The speed changer 55 varies the feed rate of the tobacco falling from the feeder 51 onto the moving belt $51b$ so as to maintain a constant average weight of tobacco per unit length at point $51c$. Such control yields a greatly improved product. However, vibrations or surging at critical points in the process may cause variations in the product $51c$ that cannot be substantially reduced by feedback action. If these vibrations can be indicated and their effect on the output product determined, they can be eliminated or greatly reduced by proper machine maintenance. Undesirable vibrations can be caused on such machinery by excessive motor vibration, rotation of bent shafts, slipping of belts or gears in the feeder section, and other machinery malfunctions.

Small, compact vibration sensors are placed at various points throughout the process as typified by $S_1$, $S_2$, $S_3$, $S_4$, $S_5$, and $S_6$. A differential pressure sensor $PS_1$ is placed at the output of the lubrication pump $51d$ to measure variations in the lubrication pressure. The lubricating fluid from reservoir $51d$ provides lubrication for the main drive motor shaft $51f$ and the speed changer 55. Vibration sensor $S_1$ determines vibration at the garniture section; vibration sensor $S_2$ measures vibration of the feeder section; vibration sensor $S_3$ measures over-all vibrations of the main drive motor 52; vibration sensor $S_4$ is attached to the feeder shaft $51h$ through a suitable coupling $51e$ and determines shaft vibrations; vibration sensor $S_5$ is attached to the main drive motor shaft $51f$ through coupling $51g$ and vibration sensor $S_6$ measures vibrations in the speed changer 55. Wear in the bearings supporting the main drive shaft $51f$ and the feeder shaft $51h$ could cause excessive vibrations.

Vibration sensors $S_1$ through $S_6$ are connected to buffer amplifiers $A_1$, $A_2$, $A_3$, $A_4$, $A_5$, and $A_6$, respectively, and differential pressure sensor $PS_1$ is connected to amplifier $A_7$. The buffer amplifiers provide a low impedance output voltage corresponding to the vibrations and pressure changes measured at the various points of the process. Switch 13 is controlled by system programmer 15 and alternately connects the outputs from the various buffer amplifiers through contacts $C_1$, $C_2$, $C_3$, $C_4$, $C_5$, $C_6$, and $C_7$ to the controlled time delay 17. The functions of the delay programmer 19 and the multiplier 21 are the same as the corresponding elements in FIG. 3. The output from the multiplier 21 is connected to the integrator circuit 23 as illustrated in FIG. 3. Subsequent operations applied to the signals from multiplier 21 are identical to those described in FIG. 3.

Figure 5:
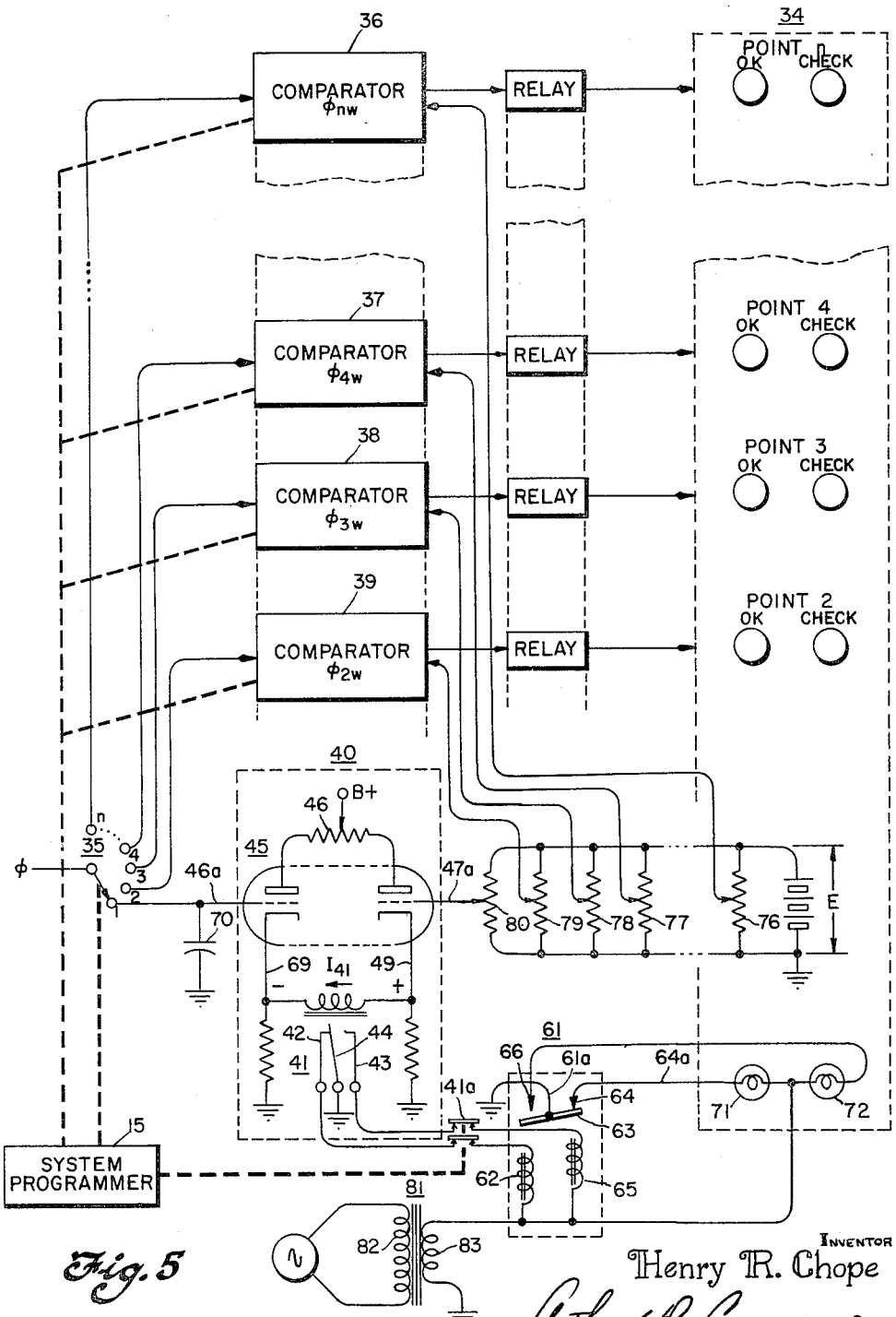
FIG. 5 is a pictorial drawing and schematic illustrating the operation of the comparator circuits used in my invention and picturing the read out of these comparisons on a trouble locator board.

FIG. 5 illustrates the operation of the comparator circuits 25 described in FIG. 3. Input programming switch 35 is controlled by the system programmer 15 and alternately feeds the values of the cross correlation coefficients to comparators 36, 37, 38, 39, and 40. The circuit diagram of comparator 40 is shown. The comparator is essentially a differential cathode follower with a polarized relay 41 connected across cathodes 69 and 49. The voltage corresponding to the cross correlation function $\phi_{1w}$ is applied by line $46a$ to the grid of tube 45. A standard voltage is obtained from the cross correlation reference setter 80 and applied to tube 45. Potentiometer 48 is the adjustment for balancing the differential cathode follower. When the voltage corresponding to the cross correlation function at line $46a$ is less than the standard voltage at line $47a$ the voltage at cathode 49 will be greater than the voltage at cathode 69. This differential voltage will cause a current to flow in the direction shown through the coil of the polarized relay 41. The center contact 44 of the polarized relay 41 will make contact with contactor 42 and cause a current to flow and thus energize coil 62 of associated latching relay 61. The associated latching relay 61 is of such design that when current flows through coil 62, center arm 63 will contact contactor 64. However, when current flows through coil 65, center arm 63 will make contact with contactor 66. When current is removed from both latching relay coil 65 and coil 62, center arm 63 will maintain its previous position and continue its contact.

As illustrated in FIG. 5, when center arm 63 is in position shown, voltages applied through line $61a$ and line $64a$ illuminate the "O.K." indicator 71. Under this condition, there is indicated at the trouble locator that the effect of vibration at the garniture section on the product output is below some predetermined value and that maintenance need not be directed to this point in the process machine. If, however, the vibration increases at the garniture section so as to cause undesirable variations in the output product, the voltage corresponding to the cross correlation function $\phi_{1w}$ will become greater than the reference voltage, $e_{1w}$, and the polarized relay 41 and the latching relay 61 will switch to positions opposite those described above. As the result of such switching action, the garniture check indicator 72 will become illuminated and hence signal that maintenance should be directed toward the garniture section.

When the system programmer 15 switches the next correlation function, $\phi_{2W}$, to comparator 39, capacitor 70 tends to hold the value at the input to comparator 40 at its previous value so as to avoid a change in the garniture indicator section of the automatic trouble locator board 34. At the same time, the system programmer 15 opens contactor 41a to avoid false indication at the garniture trouble locator section.

Transformer 81 steps down the input voltage at the primary side 82 from 110 volts to 6.3 volts at the secondary 83 and applies operating voltages for the latching relay 61 and the trouble locator lights 71 and 72. Comparators 36, 37, 38, 39, and 40 receive at their inputs the sequentially switched cross correlation functions and respectively compare the values of these functions against corresponding standard voltages obtained from the cross correlation reference setters 76, 77, 78, 79, and 80. The cross correlation setter consists of parallel, adjustable potentiometers connected across a stabilized voltage E. Each comparator activates a latching relay which in turn causes the "O.K." or "Check" light to be illuminated.

FIG. 6 is a drawing showing the automatic trouble locator board 34 of FIG. 3. The board illustrated in FIG. 6 is subdivided into vertical sections each of which indicates the maintenance condition of an associated machine. Each section is identified with a particular machine—for example, Machine 1—by letters at the top of each vertical section. The series of lights corresponding to each process machine section indicate satisfactory operation at a point or area in a process machine or else signal that a trouble has been located. For example, if the garniture section of Machine 1 vibrates excessively so as to cause corresponding variations in the output product, "O.K." light 71 will be extinguished and "Check" light 72 will become illuminated. A maintenance man would then direct his attention to the garniture section of the process machine.

The above description of my invention has been given by way of illustration and not by way of limitation, and modifications may be made thereto without departing from the spirit and scope of the invention.

What is claimed is:
1. The method of monitoring a machine for producing a product and including a machine element subject to a change in its operating condition whereby deterioration in said product specifically resulting from said change may or may not exceed a predetermined unacceptable value, said method comprising the steps of
   sensing said operating condition to produce a first signal which is a function thereof,
   measuring a characteristic of said product to produce a second signal which is a function of said characteristic,
   computing a correlation function between said first and second signals to produce a third signal indicative of the value of said function,
   setting a limiting value for said third signal in accordance with said unacceptable value of said product deterioration, and
   producing an alarm signal when said third signal attains said limiting value.

2. The method of monitoring a machine for producing a product and including a machine element subject to a change in its operating condition whereby deterioration in said product specifically resulting from said change may or may not exceed a predetermined unacceptable value, said method comprising the steps of
   sensing said operating condition to produce a first signal which is a function thereof,
   measuring a characteristic of said product to produce a second signal which is a function of said characteristic,
   utilizing said first and second signals to compute a correlation function therebetween so as to produce a third signal which is independent of the mean values of said first and second signals but which is indicative of the correlation between the variation components thereof,
   setting a limiting value for said third signal in accordance with said unacceptable value of said product deterioration, and
   producing an alarm signal when said third signal attains said limiting value.

3. The method of claim 2 wherein said first and second signals are produced in the form of electrical analog signals, and wherein said utilization step comprises removing the D.C. components from said electrical signals before computing said correlation function.

4. The combination, with a machine having a plurality of machine elements and operative to form a product, of a monitoring system for indicating the presence in any of said elements of an abnormality in its operating condition which is the specific cause of an undesirable variation in said product which may or may not exceed a predetermined unacceptable value, said system comprising
   a plurality of condition sensors each responsive to an operating condition of a respective one of said machine elements for producing a condition signal indicating variations in said operating condition thereof, said sensors being so selected and so located that the extent of the variation in each signal provides a measure of said abnormality in said condition,
   means measuring said product for producing a product variation signal,
   means for computing the cross correlation function between said product variation signal and each of said condition signals to provide a plurality of correlation function indicating signals,
   means for setting a limiting value for each of said correlation function indicating signals in accordance with said unacceptable values, and
   means responsive to correspondence between each of said correlation function indicating signals and its respective limiting value for producing a warning identification of the machine element whose abnormality causes said product variation to exceed said unacceptable value.

5. An automatic analyzer for a process machine comprising
   multiple machine vibration sensors placed at selected operating points on said machine for determining the machine vibrations at a plurality of said points,
   a measuring gauge positioned on the output side of said machine to determine output variations in the product,
   automatic means for computing a functional relationship between said machine vibrations at each of said plurality of points and variations in the measured output product,
   means for comparing each of said computed functional relationships to a standard, and
   warning indicator means responsive to said comparing means for indicating when said computed functional relationship exceeds said standard,
      said indicator means including means for identifying the one of said operating points associated with the functional relationship exceeding said standard.

6. Apparatus as set forth in claim 5 wherein said computer means comprises means for computing a correlation function between each of said sensed machine vibrations and said output product variations.

7. Apparatus according to claim 5 wherein said computing means comprises means for computing the cross correlation function between each of said sensed machine vibrations and said output product variations.

8. The combination, with a machine for producing a product and containing a plurality of machine elements whose wear or maladjustment may affect the quality of said product, of
- a plurality of vibration sensors each applied to a respective one of said elements for providing a vibration signal,
- means for measuring said product and for providing a product variation signal,
- computer means for providing a plurailty of signals each indicative of the cross correlation function between a respective one of said vibration signals and said product variation signal, and
- a warning device activated when the value of said function exceeds a selected limit,
    - said warning device including means for identifying any one of said machine elements whose vibration signal correlation function exceeds said limit.

9. The combination, with a machine having a plurality of machine elements sequentially operative on a material to form a product at the output of the machine, of a monitoring system for indicating the presence in any of said elements of an abnormality in its operating condition which causes undesirable variations in said product, said system comprising
- a plurality of condition sensors each responsive to an operating condition of a respective one of said machine elements for producing a condition signal indicating variations in said operating condition thereof,
    - said sensors being so selected and so located that the extent of the variation in each signal provides a measure of said abnormality in said condition,
- means measuring said product for producing a product variation signal,
- means for computing the cross correlation function between said product variation signal and each of said condition signals to provide a plurality of correlation function indicating signals,
    - said computing means including means for delaying said condition signals for different time periods, and
- warning indicator means responsive to said function indicating signals for identifying the associated one of said machine elements when the value of the respective signal exceeds a selected limit.

10. Apparatus as in claim 9 wherein said delay time periods for said signal delays differ from each other by an amount equal to the differences in the transporion lags of the material in traveling from the respective machine elements to said measuring means.

11. Apparatus as in claim 9 wherein said delay means delays each of said signals for a time period equal to the transportation lag of said material in traveling from a respective machine element to said measuring means.

12. The combination, with a machine having a plurality of machine elements sequentially operative on a material to form a product at the output of the machine, of a monitoring system for indicating the presence in any of said elements of an abnormality in its operating condition which causes undesirable variations in said product, said system comprising
- a plurality of condition sensors each responsive to an operating condition of a respective one of said machine elements for producing a condition signal indicating variations in said operating condition thereof,
- means measuring said product for producing a product variation signal,
- means for computing the cross correlation function between said product variation signal and one of said condition signals to provide a correlation function indicating signal,
    - said computing means including means for delaying said condition signals for different time periods in accordance with the differences in the transport lag of said material in traveling from a respective machine element to said measuring means,
- selector means having a plurality of states for routing said condition signals individually to said computing means,
    - said selector means including means for selecting a corresponding one of said different delay time periods provided by said delaying means, and
- warning indicator means responsive to said function indicating signal and to the state of said selector for identifying the machine element associated with the condition signal routed to said computer by said selector whenever the value of said function indicating signal exceeds a selected limit.

13. The combination, with a machine having a plurality of machine elements operative on a material to form a product at the output of the machine, of a monitoring system for indicating the presence in any of said elements of an abnormality in its operating condition which causes undesirable variations in said product, said system comprising
- a plurality of condition sensors each responsive to an operating condition of a respective one of said machine elements for producing a condition signal indicating variations in said operating condition thereof,
- means measuring said product for producing a product variation signal,
- means for computing the cross correlation function between said product variation signal and one of said condition signals to provide a correlation function indicating signal,
    - said computing means including means for delaying said condition signals for different time periods in accordance with the differences in the transport lag of said material in traveling from a respective machine element to said measuring means,
- a plurality of means for setting limiting values for said function indicating signals,
- a programmed selector for routing said condition signals individually and in sequence to said computing means,
    - said selector including means for selecting said delay time periods individually and in sequence to correspond with the condition signals routed to said computing means,
- means controlled by said selector for sequentially comparing said function indicating signal with individual ones of said limiting values, and
- means energized by said comparison means for providing a warning signal when one of said limiting values is exceeded by said function indicating signal.

14. The combination, with a machine having a plurality of machine elements operative on a material to form a product at the output of the machine, of a monitoring system for indicating the presence in any of said elements of an abnormality in its operating condition which causes undesirable variations in said product, said system comprising
- a plurality of condition sensors each responsive to an operating condition of a respective one of said machine elements for producing a condition signal indicating variations in said operating condition thereof,
- means measuring said product for producing a product variation signal,
- means for computing the cross correlation function between said product variation signal and one of said condition signals to provide a correlation function indicating signal, said computing means including means for delaying said condition signals for different time periods in accordance with the differences in the transport lag of said material in traveling from a respective machine element to said measuring means, a plurality of means for setting limiting values for said function indicating signal, a programmed selector for routing said condition signals individually and in sequence to said computing means, said selector including means for selecting said delay time periods individually and in sequence to correspond with the condition signals routed to said computing means, means controlled by said selector for sequentially comparing said function indicating signal with individual ones of said limiting values, and means energized by said comparison means for providing a warning signal when one of said limiting values is exceeded by said function indicating signal, said warning signal means comprising a plurality of binary circuits adapted to be switched from one to the other of two stable states by said comparator means under the control of said selector, and a plurality of indicating lights each indicating by its dark or illuminated condition the existing state of one of said binary circuits.

References Cited by the Examiner

UNITED STATES PATENTS

| | | |
|---|---|---|
| 2,965,300 | 12/1960 | Radley et al. |
| 3,013,721 | 12/1961 | Foster et al. |
| 3,045,221 | 7/1962 | Roop. |
| 3,147,370 | 9/1964 | Lowman. |

NEIL C. READ, *Primary Examiner.*

R. M. ANGUS, *Assistant Examiner.*